(12) United States Patent
Sobolevskiy et al.

(10) Patent No.: US 7,989,385 B2
(45) Date of Patent: Aug. 2, 2011

(54) PROCESS OF ACTIVATION OF A PALLADIUM CATALYST SYSTEM

(75) Inventors: Anatoly Sobolevskiy, Orlando, FL (US); Joseph A. Rossin, Columbus, OH (US); Michael J. Knapke, Columbus, OH (US)

(73) Assignee: Siemens Energy, Inc., Orlando, FL (US)

( * ) Notice: Subject to any disclaimer, the term of this patent is extended or adjusted under 35 U.S.C. 154(b) by 86 days.

(21) Appl. No.: 12/613,176

(22) Filed: Nov. 5, 2009

(65) Prior Publication Data
US 2011/0105314 A1    May 5, 2011

(51) Int. Cl.
B01J 27/053 (2006.01)
B01J 27/045 (2006.01)
B01J 23/42 (2006.01)
B01J 23/44 (2006.01)

(52) U.S. Cl. .......... 502/217; 502/223; 502/339

(58) Field of Classification Search .......... 502/217, 502/223, 339
See application file for complete search history.

(56) References Cited

U.S. PATENT DOCUMENTS

| | | | |
|---|---|---|---|
| 3,032,599 A * | 5/1962 | Bailey et al. | 585/730 |
| 3,098,712 A * | 7/1963 | Andersen et al. | 423/219 |
| 3,360,481 A | 12/1967 | McLaren | |
| 3,931,045 A | 1/1976 | Rush | |
| 4,312,638 A | 1/1982 | Koump | |
| 5,543,124 A | 8/1996 | Yokota et al. | |
| 5,589,142 A | 12/1996 | Gribbon | |
| 5,710,085 A | 1/1998 | Absil et al. | |
| 5,753,192 A * | 5/1998 | Dobson et al. | 422/177 |
| 5,891,409 A | 4/1999 | Hsiao et al. | |
| 5,955,039 A | 9/1999 | Dowdy | |
| 6,266,957 B1 | 7/2001 | Nozawa et al. | |
| 6,267,940 B1 | 7/2001 | Chang et al. | |
| 6,475,943 B1 | 11/2002 | Hoek et al. | |
| 6,513,319 B2 | 2/2003 | Nozawa et al. | |
| 6,689,709 B1 | 2/2004 | Tran et al. | |
| 7,049,261 B2 | 5/2006 | Nam et al. | |
| 7,096,667 B2 | 8/2006 | Laster et al. | |
| 7,105,137 B2 | 9/2006 | Efstathiou et al. | |
| 7,179,426 B2 | 2/2007 | Hottovy et al. | |
| 7,247,592 B2 | 7/2007 | Echigo et al. | |
| 7,371,706 B2 * | 5/2008 | Ohtsuka et al. | 502/339 |

(Continued)

OTHER PUBLICATIONS

"Roles of palladium and platinum in the selective catalytic reduction of nitrogen oxides by methane on palladium-platinum loaded sulfated zirconia," Hirofumi Ohtsuka et al. Applied Catalysis B: Environmental 29 (2001), pp. 177-183.*

(Continued)

Primary Examiner — Patricia L Hailey

(57) ABSTRACT

Improved processes for activating a catalyst system used for the reduction of nitrogen oxides are provided. In one embodiment, the catalyst system is activated by passing an activation gas stream having an amount of each of oxygen, water vapor, nitrogen oxides, and hydrogen over the catalyst system and increasing a temperature of the catalyst system to a temperature of at least 180° C. at a heating rate of from 1-20°/min. Use of activation processes described herein leads to a catalyst system with superior NOx reduction capabilities.

20 Claims, 6 Drawing Sheets

U.S. PATENT DOCUMENTS

| | | | |
|---|---|---|---|
| 7,390,471 | B2 | 6/2008 | Sobolevskiy et al. |
| 7,744,840 | B2 * | 6/2010 | Sobolevskiy et al. ...... 423/239.1 |
| 2007/0110643 | A1 | 5/2007 | Sobolevskiy et al. |
| 2007/0181854 | A1 | 8/2007 | Briesch et al. |
| 2007/0289214 | A1 | 12/2007 | Briesch et al. |
| 2008/0196388 | A1 | 8/2008 | Johnson et al. |
| 2008/0299016 | A1 * | 12/2008 | Sobolevskiy et al. ......... 422/171 |
| 2009/0020410 | A1 | 1/2009 | Niwa et al. |
| 2010/0061903 | A1 * | 3/2010 | Kohara et al. .............. 423/213.2 |

OTHER PUBLICATIONS

"Characterization of palladium supported on sulfated zirconia catalysts by DRIFTS, XAS, and n-butane isomerization reaction in the presence of hydrogen," Gustavo Larsen et al. Applied Catalysis A: General 130 (1995) pp. 213-226.*

C.N. Costa, et al., Industrial H2-SCR of NO on a novel Pt/MgO-CeO2 catalyst, Applied Catalysis B.: Environmental 75 (2007) 147-156, available online May 4, 2007, www.sciencedirect.com.

* cited by examiner

PROCESS OF ACTIVATION OF A PALLADIUM CATALYST SYSTEM

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The present invention relates to processes for activating a novel palladium catalyst system to be employed in the reduction of nitrogen oxides ($NO_x$) in a gaseous stream, e.g., combustion exhaust, by selective catalytic reduction (SCR) using hydrogen ($H_2$) as the reducing agent. The present invention also relates to the field of power generation, and more particularly to the control of $NO_x$ emissions produced during combustion of a fuel containing hydrogen to generate power, and specifically to the catalytic treatment of exhaust gases from a gas turbine at a coal gasification plant. However, the invention may also be employed in $NO_x$ abatement from other sources, such as emissions generated during manufacture of nitric acid, within internal combustion engines and the like.

BACKGROUND OF THE INVENTION

Coal-based integrated gasification combined cycle plant (IGCC) technology enables production of electricity with a gas turbine utilizing a fuel that is rich in hydrogen and has a very limited amount of $CO_2$. Combustion of the hydrogen-containing fuel requires an oxidizing source such as air, which contains nitrogen ($N_2$). As a result, a by-product in exhaust gas stemming from hydrogen-containing fuel combustion is a significant amount of $NO_x$. The $NO_x$ in the exhaust gas may be reduced by using selective catalytic reduction (SCR) systems along with low $NO_x$ combustors in the gas turbine. Since fuel produced and used at an IGCC plant contains hydrogen ($H_2$), the fuel may also provide hydrogen as a reducing agent in the SCR process by introducing a small amount of $H_2$ from the fuel supply into the SCR system. The use of hydrogen as a $NO_x$ reducing agent enables the elimination of typical reducing agents, for example, ammonia ($NH_3$) and urea ($N_2H_6CO$) in the SCR system, and thus prevents discharge of ammonia slip into the ambient air, which is an inherent problem with current ammonia-based SCR technology.

Recently, a strong attempt to improve $H_2$-SCR efficiency with respect to $NO_x$ removal and $N_2$ selectivity under oxidizing conditions was made in U.S. patent application Ser. No. 12/122,116, the entirety of which is hereby incorporated by reference. As described in U.S. patent application Ser. No. 12/122,116, a palladium (Pd) catalyst showed a substantial increase in $NO_x$ reduction efficiency over a platinum (Pt) catalyst that was disclosed in U.S. Pat. No. 7,105,137, for example, under gas turbine exhaust conditions. In U.S. patent application Ser. No. 12/472,633, the entirety of which is also incorporated by reference herein, the Pd-based catalyst system was further modified by incorporating a pre-sulfated zirconium binder. While not wishing to be bound by any particular theory, the inventors believed that the pre-sulfated zirconia binder protects the palladium catalyst from degradation by binding sulfur to the defects in the crystalline zirconia structure, thereby minimizing further sulfur poisoning during contact with an exhaust gas containing $SO_2$.

BRIEF DESCRIPTION OF THE DRAWINGS

The invention is explained in the following description in view of the drawings that show.

DETAILED DESCRIPTION OF THE INVENTION

The inventors have surprisingly found that by activating a catalyst system used for the reduction of $NO_x$ in an HRSG according to the activation process parameters described herein significantly increases the subsequent $NO_x$ reducing efficiency of the catalyst system. In the activation process, an activation gas stream comprising an amount of each of oxygen, water vapor, nitrogen oxides, and hydrogen is passed over the catalyst system, typically prior to use of the catalyst system to reduce an amount of $NO_x$ in an industrial (process) gas stream. In one advantageous embodiment, the temperature of the catalyst system is heated to a temperature of at least 180° C. at a heating rate of from 1-20°/min during the activation process. In another embodiment, since oxygen, water vapor, nitrogen oxides ($NO_x$), and hydrogen may be present in a process gas stream (e.g., exhaust gas from combustion utilizing natural gas fuel), the process gas stream may advantageously be utilized to activate the catalyst system prior to utilizing the catalyst system at the optimum temperature for reducing an amount of $NO_x$ in the process gas stream. In the latter embodiment, hydrogen may be required to be added to the process gas stream during the activation process if there is initially an insufficient amount of hydrogen in the process gas stream.

Figure 1:
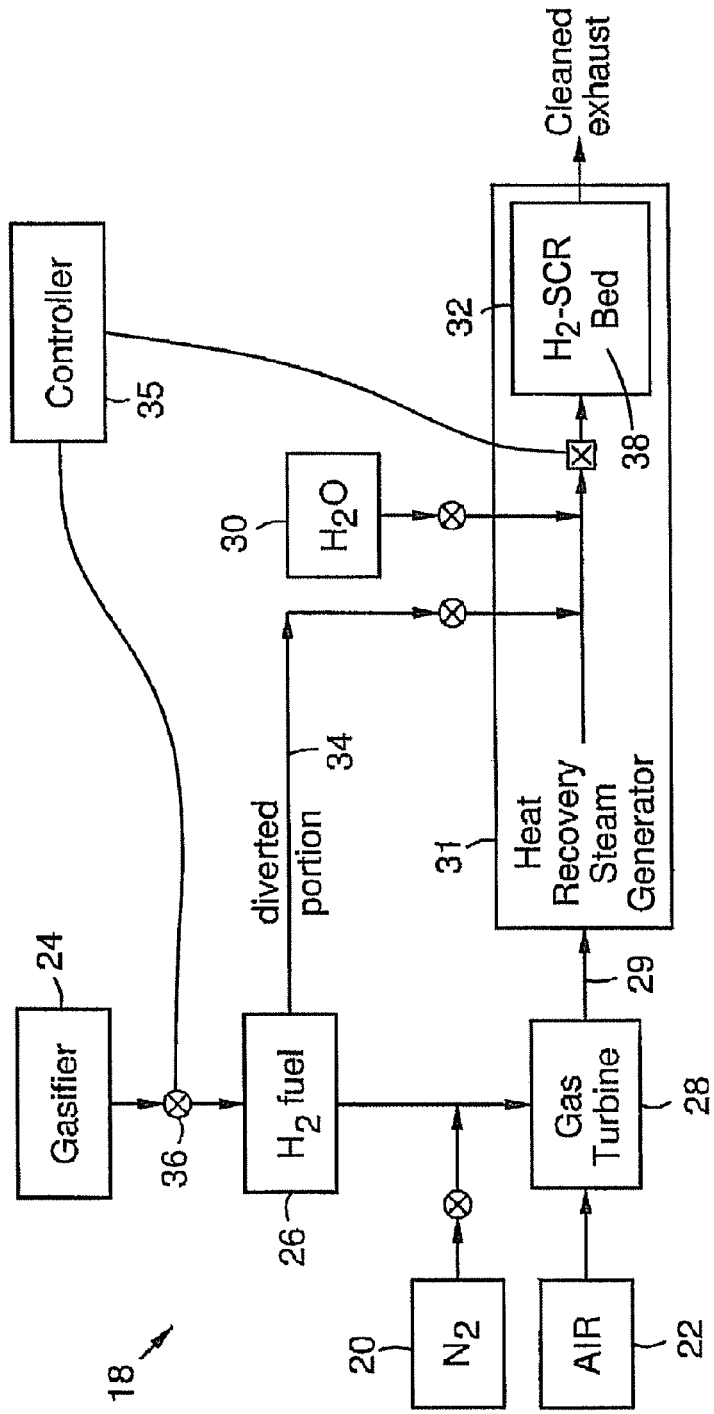
FIG. 1 is a schematic view of an integrated gasification combined cycle power plant in accordance with an aspect of the present invention.

Now referring to the figures, FIG. 1 illustrates an integrated gasification combined cycle power plant system 18 that produces an $H_2$-containing fuel 26 (syngas, or $H_2$-rich fuel after $CO_2$ capture) using a gasification process at gasifier 24. The fuel 26 is diluted with nitrogen 20, and combined with air 22 for combustion in a gas turbine 28. Turbine exhaust gas 29 is directed to a heat recovery steam generator (HRSG) 31, which includes or is otherwise located upstream of a selective catalytic reduction (SCR) bed that is positioned at a location suitable for a desired SCR temperature operating range. The exhaust passes to the SCR bed, e.g., an $H_2$-SCR bed 32 as shown, where one or more $NO_x$ reduction catalyst layers of a catalyst system 38 promote the destruction of $NO_x$ by a reducing agent, such as for example $H_2$, producing primarily $N_2$ and $H_2O$. A diverted portion 34 of the $H_2$-containing fuel 26 may be used as a reducing agent for the $NO_x$ reduction reaction in the $H_2$-SCR bed 32. A water injection system 30 may be used to improve $NO_x$ reduction reactions within the $H_2$-SCR bed 32. A controller 35 is connected to sensors and valves 36 to sense and control the process. The $H_2$-SCR bed 32 comprises the catalyst system 38 with long-term stability when exposed to the turbine exhaust gas 29, which may have high contents of oxygen, water, and sulfur.

In one embodiment, the $H_2$-SCR bed 32 is in a geometric form that allows for high $NO_x$ reduction efficiency along with a minimal pressure drop. Although beads, extrudates, etc. are suitable geometric forms employed in commercial applications, a monolith is a preferred form. The monolithic form and the use of a monolith as a catalyst carrier are well known to one skilled in the art. A monolith consists of a series of straight, non-interconnecting channels. Onto the walls of the monolith are coated a thin layer of a catalyst-containing material, termed "washcoat" by the trade. It is within the pores of the washcoat that the catalytically active metals and binder are located. Thus, in one embodiment, a honeycomb monolith may be washcoated with a catalyst system as described herein.

Figure 2:
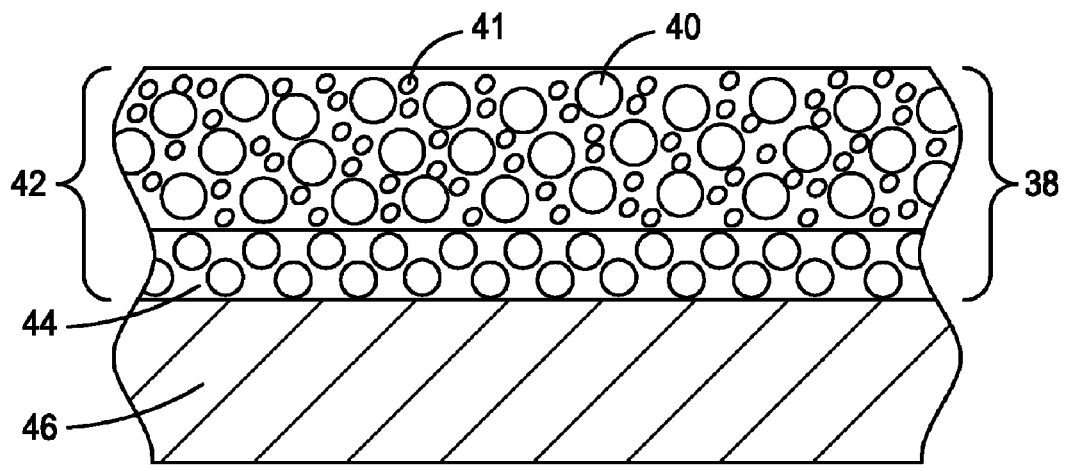
FIG. 2 is a side view of a catalyst system comprising a pre-sulfated zirconia binder in accordance with an aspect of the present invention.

In one embodiment, as shown in FIG. 2, the catalyst system 38 comprises a washcoat 42 comprising washcoat particles, e.g., zirconia support particles 41, a catalyst 40, and a pre-sulfated zirconia binder 44. The zirconia support particles 41 may comprise one of sulfated-zirconia $((ZrO_2)SO_4)$ particles or sulfated-zirconia-silica oxide $((ZrO_2-SiO_2)SO_4)$ particles. The catalyst 40 may be any suitable palladium-based catalyst known in the art and is impregnated within or is otherwise associated with the zirconia support particles 41. While FIG. 2 depicts the pre-sulfated zirconia binder 44 as a distinct layer for ease of reference, it is understood that the pre-sulfated zirconia binder 44 may be uniformly distributed throughout the washcoat 42. The pre-sulfated zirconia binder 44 enables the washcoat 42 containing the catalyst 40 to be bound to a monolithic substrate 46, for example. A fuller description of the compositions and methods for making an exemplary catalyst system 38 for use in embodiments of the present invention are set forth in U.S. patent application Ser. No. 12/472,633, the entirety of which is incorporated by reference.

Figure 3:
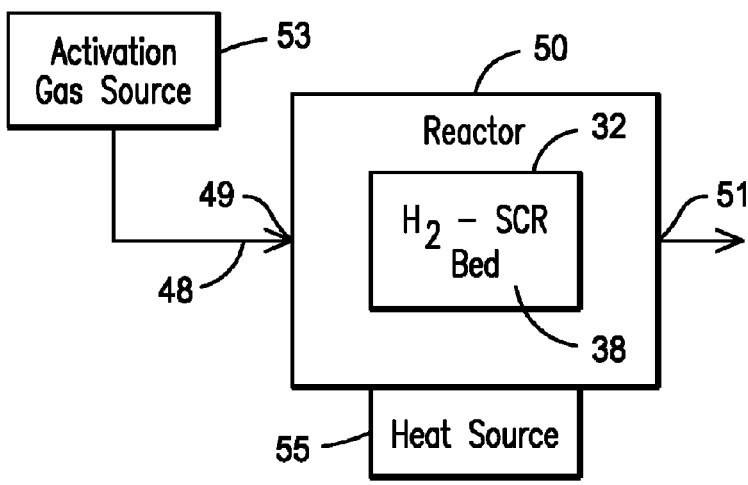
FIG. 3 is a schematic view of a reactor having an $H_2$-SCR bed and an activating gas stream for activating the $H_2$-SCR bed in accordance with an aspect of the present invention.

In accordance with an aspect of the present invention, the catalyst system 38 of the $H_2$-SCR bed 32 is activated by exposing the $H_2$-SCR bed 32 to a flowing activation gas stream. For example, as shown in FIG. 3, an activation gas stream 48 is provided from a suitable activation gas source 53 and is shown flowing from an inlet 49 of an activation reactor 50 over the $H_2$-SCR bed 32 in a downstream direction and out an outlet 51 of the activation reactor 50. Typically, the $H_2$-SCR bed 32 is exposed to a flowing activation gas stream prior to the exposure of the turbine exhaust gas 29 to the $H_2$-SCR bed 32 of the HRSG 31 at a lower temperature, e.g., one optimal for $NO_x$ reduction. Accordingly, the activation reactor 50 may comprise the HSRG 31 itself or may comprise any other suitable enclosed reaction chamber or vessel. In one embodiment, the activation gas source 53 comprises all the components necessary for activation of the catalyst system. In another embodiment, as shown in FIG. 3, at least a portion to all of the hydrogen for the activation gas stream 48 is provided from a hydrogen source (not shown) separate from the activation gas source 53 that provides the remainder of the activation gas stream 48. The hydrogen may then be combined with the remainder of the activation gas stream, prior to or within the activation reactor 50, to produce the complete activation gas stream 48. The latter embodiment is typical when the activation gas stream 48 is provided from combustion in the gas turbine 28, for example.

Figure 4:
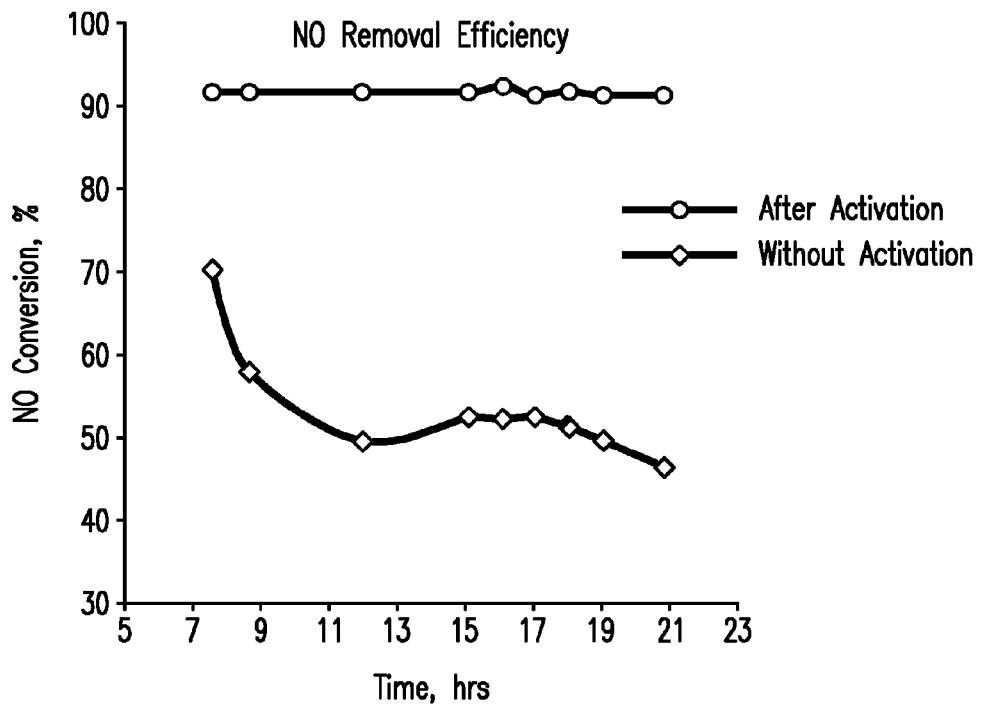
FIG. 4 is a graph showing the $NO_x$ reduction efficiency of the catalyst system of FIG. 2 (after activation and with no recirculation of the activation gas stream) vs. without activation for a simulated gas turbine exhaust stream comprising 800 ppm $H_2$; 5-25% $H_2O$; 10% $O_2$; 10 ppm NO; 5 ppm $SO_2$; and balance $N_2$.

As is shown in FIG. 4, after activation of the catalyst system 38 with the activation gas stream 48, the catalyst system 38 demonstrates a high (more then 90%) reduction efficiency for $NO_x$ when exposed to a subsequent gas stream comprising an amount of $NO_x$ to be reduced (the "process gas stream"). The previously-described turbine exhaust gas 29 is an exemplary process gas stream and it is appreciated that the process gas stream may be any other naturally-occurring, synthetic, or produced gas stream containing an amount of $NO_x$ to be reduced. In one embodiment, the activation gas stream 48 and the process gas stream are the same stream, e.g., are provided from the same source. In this embodiment, the process gas stream may advantageously be utilized to activate the catalyst system 38 at a temperature greater than the optimal temperature of the catalyst system 38 for the removal of $NO_x$ from the process gas stream.

From the results depicted in FIG. 4, it was also determined (for a catalyst system 38 having the same formulation) that not activating the catalyst system 38 led to a significant decline of the $NO_x$ removal efficiency of a subsequent process gas stream, e.g. turbine exhaust gas 29. Further, as shown in FIG. 4, the efficiency of a non-activated catalyst system in reducing $NO_x$ emissions declines significantly with longer exposure of the catalyst system 38 to the process gas stream. While not wishing to be bound by theory, it is believed that the sharp decline in the performance of the catalyst system 38 when an activation process is not used is due to the presence of sulfur compounds in the process gas stream. For example, sulfur compounds in the turbine exhaust gas 29 may eventually poison the catalyst system 38 due to formation of strong chemical bonds between the palladium (Pd) catalyst of the catalyst system 38 and sulfur (S) in the process gas stream. The activated catalyst system 38, however, has a much higher resistivity to sulfur poisoning upon activation of the catalyst system according to the processes described herein.

It has also been found based on data presented in FIG. 4 that the efficiency of an activated catalyst system, e.g., catalyst system 38, in many cases strongly depends on the time the catalyst system 38 is exposed to the process gas stream (having an amount of $NO_x$ to be reduced). A catalyst system's performance may be evaluated, for example, after at least 6-10 hours of operation (after activation) in order to make a meaningful determination of the durability of the catalyst system after activation. As can been seen from FIG. 4, when the catalyst system 38 is activated according to the parameters described herein, the catalyst system 38 demonstrates stable performance over a prolonged period of operation. Conversely, the catalyst system 38 without activation cannot sustain high performance and its performance rapidly degenerates over time.

Figure 5:
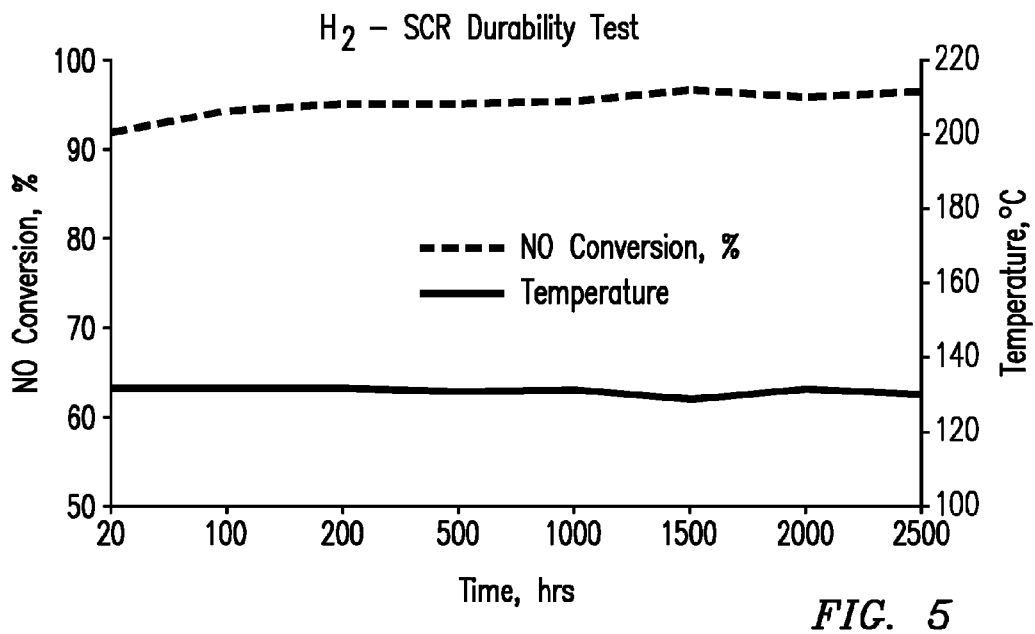
FIG. 5 is a graph showing the durability of the catalyst system of FIG. 2 (after activation and with no recirculation of the activation gas stream) with a simulated gas turbine exhaust stream comprising 800 ppm $H_2$; 5-25% $H_2O$; 10% $O_2$; 10 ppm NO; 5 ppm $SO_2$; and balance $N_2$.
Figure 6:
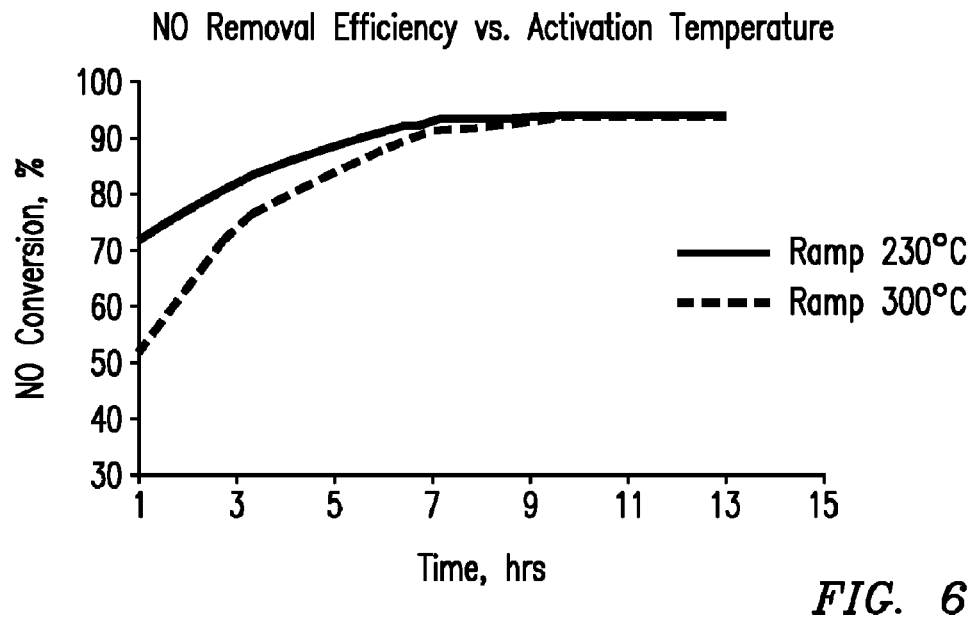
FIG. 6 is a graph showing an optimum activation temperature in the range of from 230-300° C.
Figure 7:
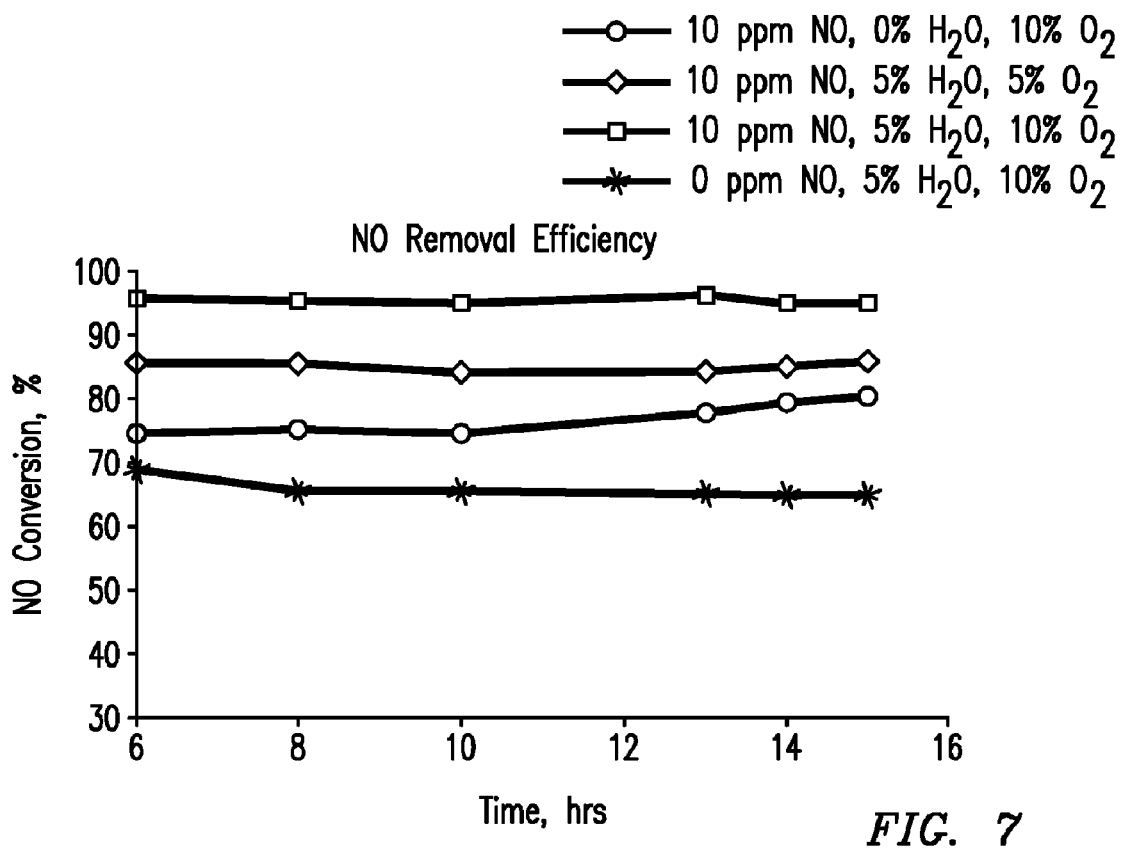
FIG. 7 is a graph showing the desirability of having NOx, water vapor, and oxygen in the activation gas stream.
Figure 8:
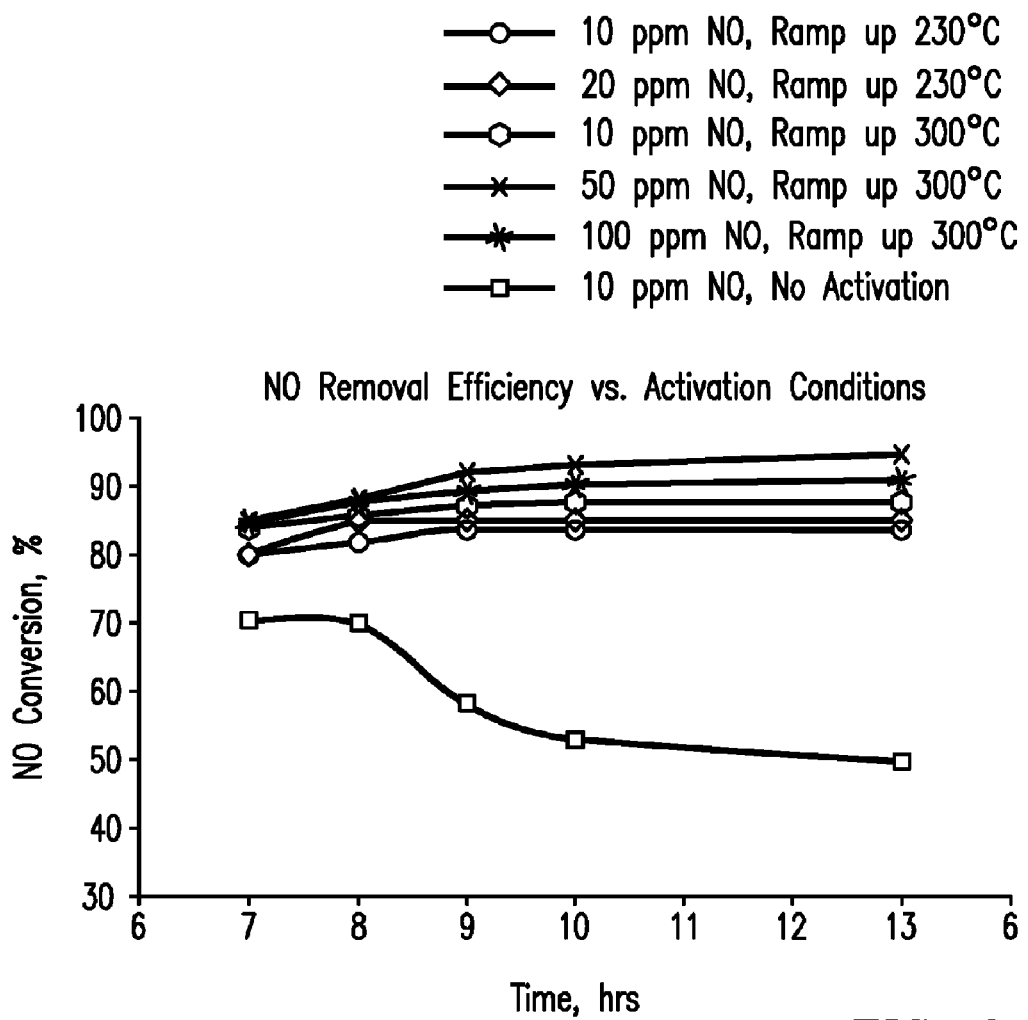
FIG. 8 is a graph showing the desirability of activating the catalyst system with an activation gas stream comprising an amount of $NO_x$.

In order to further determine if the catalyst system 38 (activated with the activation gas stream 48) is durable over long periods of time, the catalyst system 38 was tested for 2500 hours under the conditions described in the Example 3. FIG. 5 shows the results of this testing. These results indicate that an activated catalyst system 38 is able to retain a very high level of $NO_x$ conversion for long periods without compromising its performance. Conversely, as can also be seen also from FIG. 5, without activation, the catalyst system's performance is substantially lower and does not demonstrate required stability. In addition, the results presented in FIG. 5 demonstrate that the catalyst system 38 (after being activated) is stable and is able to maintain a level of $NO_x$ conversion greater than 90% throughout the 2500 hours of continuous operation.

The activation of the catalyst system 38 may take place in the activation reactor 50, which may be the same reaction vessel that is used for $NO_x$ reduction of the process gas stream (e.g., turbine exhaust gas 29), or may be any other suitable vessel. An exemplary activation reactor 50 is the HRSG 31 downstream of the gas turbine 28. In one embodiment, as shown in FIG. 3, the activation reactor 50 includes a suitable heat source 55 in communication with a power source for controlling a temperature within the activation reactor 50 and, as a result, of the catalyst system 38 in the activation reactor 50. The heat source 55 may comprise one or more suitable heating elements for maintaining a temperature within the activation reactor 50 and for increasing and/or decreasing the temperature within the activation reactor 50 at a controlled rate. For example, one or more heating elements, such as an electrode, may be disposed within the activation reactor 50 to provide the heat required for the activation process. It is understood, however, that the activation gas stream 48 may also provide at least a portion of the heat necessary for the activation reactor 50 to obtain a predetermined temperature.

The activation gas stream 48 passing over the catalyst system 38 may be any gas stream comprising an amount of oxygen, water, nitrogen oxides, and hydrogen. By the term "passing over," it is understood that the activation system may flow over, within, or through the structure, e.g. a monolith, comprising the catalyst system 38. In one embodiment, the activation gas stream may comprise oxygen in a concentration of from 1-15 vol. %, water vapor in a concentration of from 1-25 vol %, nitrogen oxides ($NO_x$) in a concentration of from 10-100 ppm, and hydrogen in a concentration that provides a hydrogen/nitrogen oxides molar ratio of from 1-100. In a particular embodiment, the activation gas stream 48 may include, for example, 5-18% of $O_2$, 1-5% of $H_2O$, 10-50 ppm of $NO_x$, up to 800 ppm of $H_2$, and a balance of $N_2$. Optionally, the activation gas stream 48 comprises an inert gas, e.g., nitrogen, as the balance. The inert gas may be any suitable component, which does not react with other gases in the activation gas stream 48 or the components of the catalyst system 38. It has been found that the composition of the activation gas stream 48 being introduced into the activation reactor 50 substantially affects the subsequent catalyst performance. As mentioned above, the presence of each of oxygen, water, nitrogen oxides, and hydrogen in the activation gas stream results has been found to be critical for the improved performance of the catalyst system 38 in reducing $NO_x$ from a subject gas stream after activation.

For example, FIGS. 4-5 show comparative studies of steams differing in the amount of nitrogen oxides, water vapor, and oxygen present in the activation gas stream 48. The nitrogen oxides ($NO_x$) concentration in the activation gas stream 48 may be from 10-100 ppm, and in another embodiment, from 10-50, and in yet another embodiment, 50 ppm. As shown in FIG. 5, the $NO_x$ concentration in the activation gas stream 48 may be 50 ppm, which provides a maximum $NO_x$ removal efficiency during treatment of a subsequent process gas stream, e.g., turbine exhaust gas 29. In addition, in the activation gas stream 48, hydrogen may be provided in an amount effective to provide a hydrogen/nitrogen oxides molar ratio of from 5-100, and in one embodiment, from 8-80. Further, the water vapor concentration in the activation gas stream 48 may be from 1-25 vol. %, and in one embodiment, is from 1-5 vol. %. The oxygen concentration in the activation gas stream 48 may be from 1-18 vol. %, and in one embodiment, 5-18 vol. %, and in another embodiment from 5-10 vol. %. In all cases, stable catalyst performance over time was achieved when the catalyst system 38 was activated based on described parameters set forth herein.

The temperature of the catalyst system 38 is increased during activation to a temperature that is typically higher than the normal (most desirable) operating temperature (e.g., 100-140° C.) of the catalyst system 38 to achieve high $NO_x$ removal efficiency for a subsequent process gas stream (e.g., turbine exhaust gas 29). Put another way, during activation, the catalyst system 38 is heated to a temperature greater than a temperature to which the catalyst system 38 will be heated during the intended and optimal use of the catalyst system 38 to remove $NO_x$ from the process gas stream. In one embodiment, during activation, the catalyst system 38 is heated to a maximum activation temperature in the range of 200-500° C., and in another embodiment, to a maximum activation temperature in the range of from 230-300° C. (as shown on FIG. 3). Once reaching the maximum activation temperature, the catalyst system 38 may be maintained at the maximum activation temperature for a duration or the catalyst system 38 may be cooled to the normal operating temperature of the catalyst system 38.

The catalyst system is typically heated to the maximum temperature from a starting temperature at a heating rate of from 1-20° C./min, and in one embodiment, from 2-10° C./min. The starting temperature is typically ambient temperature, e.g., about 25° C., but is not necessarily so. A higher heating rate reduces the duration of the activation process and, consequently, usage of gaseous components required for activation. In one embodiment, the temperature of the catalyst system 38 is brought to the required temperature by the flow of the activation gas stream 48 in the activation reactor 50 with the addition of $H_2$ at a predetermined heating rate. The heat source 57 may add heat to the activation reactor 50 if necessary to arrive at the desired temperature. After the end of the activation process, the temperature of the catalyst system 38 can be lowered to normal optimal operating temperature (100-140° C.) to achieve high NO removal efficiency for the subject process gas stream, e.g., turbine exhaust gas 29. In this way, during activation, the catalyst system 38 is heated to a temperature above a normal operating temperature of the catalyst system 38 for the subsequent $NO_x$ reduction reaction. Once the catalyst system 38 is activated, no additional steps are needed for the duration of the usage of the catalyst system 38.

The amount of the activation gas stream 48 fed per hour per volume of the catalyst 40 (or the Gas Hourly Space Velocity (GHSV)) may be in the range of from 5,000-25,000 hr-1, and in another embodiment, from 10,000-15,000 hr-1. Typically, the activation gas stream 48 is passed over the catalyst system for an amount of time effective to activate the catalyst system 38, e.g., for a time sufficient for the catalyst system to remove $NO_x$ more effectively than if the catalyst had not been subject to the activation gas stream 48 at the temperatures described herein. In one embodiment, the activation gas stream 48 is passed over the catalyst system for a duration of at least 7 minutes, and in another embodiment, for at least 10 minutes, and in yet another embodiment, for at least an hour at a heating rate of between 1-20° C. During the activation process, the temperature of the catalyst system 38 is typically heated, e.g., ramped, to the maximum temperature. In one embodiment, the temperature of the catalyst system 38 may be held at the maximum temperature for a period of time, for example, from 1 to 300 minutes.

In one embodiment, the activation gas stream 48 may actually be an exhaust gas from fossil fuel combustion, e.g., turbine exhaust gas 29, having added amounts of hydrogen. The turbine exhaust gas 29 may be introduced into the activation reactor 50 and brought to the desired temperature for the duration of the activation process. Hydrogen may be introduced into the activation reactor from a suitable hydrogen source (not shown) as mentioned above.

Figure 9:
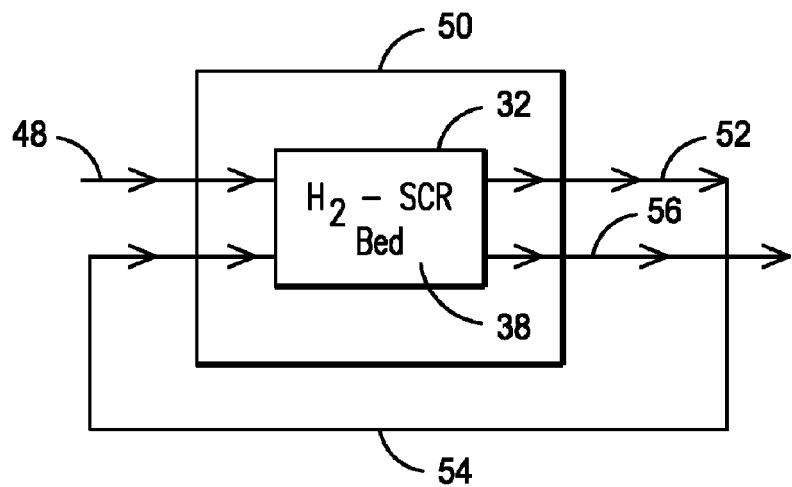
FIG. 9 is a schematic view of an activation gas stream being recirculated through an activation reactor in accordance with an aspect of the present invention.

In accordance with another aspect of the present invention, the flow of the activation gas stream 48 for the activation of the catalyst system 38 can be recycled (or at least partially recycled) from an outlet to an inlet of the activation reactor 50. As shown in FIG. 9, for example, the activation gas stream 48 may be passed over the catalyst system 38 in a first pass 52 and thereafter at least a portion of the activation gas stream 48 is recirculated 54 over the catalyst system 38 of the $H_2$-SCR bed 32 in at least a second pass 56. The recycling of the activation gas stream 48 (or at least a portion thereof) to the activation reactor 50 substantially simplifies the activation of the catalyst system 38 and allows one to introduce an amount of the activation gas stream 48 into the activation reactor 50 and thereafter discontinue any additional supply of the activation gas stream 48 into the activation reactor 50. In this way, recirculation of the activation gas stream 48 allows one to substantially reduce the amount of gaseous components that are used in the activation process, especially for industrial applications of the above described catalyst system 38. It is understood that although one recirculation cycle of the activation gas stream 48 is depicted, the activation gas stream 48 may be recycled through the activation reactor 50 continuously and multiple times for the duration of the activation process. As has been shown on FIGS. 4-5, the recirculation of the activation gas stream 48 during the activation process also provides a high $NO_x$ removal efficiency (greater than 90%) with a subsequent process gas stream. When the activation gas stream is the process gas stream particularly, this aspect of the present invention vastly reduces the amount of gas required for activation of the catalyst system 38.

Figure 10:
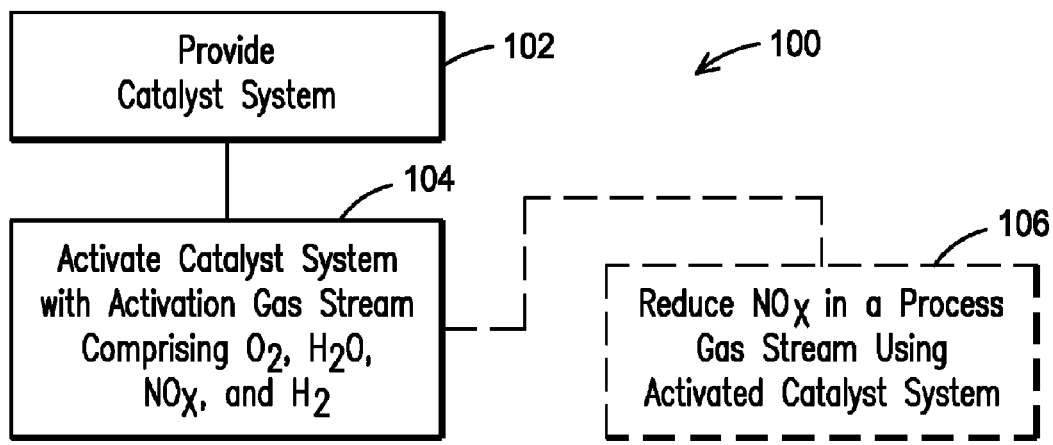
FIG. 10 is a flow diagram showing a method for utilizing a catalyst system in accordance with an aspect of the present invention.

Referring now to FIG. 10, there is exemplified an embodiment of a method 100 for activating a catalyst system 38 as described herein. Advantageously, the method 100 activates the catalyst system 38 prior to use of the catalyst system 38 for the reduction of $NO_x$ in a process gas stream. The method comprises step 102 of providing a catalyst system 38 comprising zirconia support particles, palladium, and a pre-sulfated zirconia binder. Thereafter, the method 100 comprises step 104 of activating the catalyst system 38 (as described herein) by passing an activation gas stream 48 (as described herein) comprising at least each of oxygen, water vapor, nitrogen oxides, and hydrogen over the catalyst system 38 and increasing a temperature of the catalyst system 38 to a temperature of at least about 180° C. at a heating rate of from 1-20° C. In one particular embodiment, the catalyst system 38 is heated to a maximum temperature of from 230° C. to 300° C. at a heating rate of 2-10° C./min over a period of at least ten minutes, and in one embodiment, for at least an hour. Optionally, the catalyst system 38 is cooled upon reaching the maximum temperature. In another embodiment, the catalyst system 38 is held at the maximum temperature for a period of time. Further optionally, the method 100 comprises after step 102 of activating, step 106 of contacting the activated catalyst system with a process gas stream having a $NO_x$ concentration, e.g., turbine exhaust gas 29, to reduce at least a portion of the $NO_x$ concentration in the process gas stream. In one embodiment, the method 100 further includes during the step 102 of activating, flowing the activation gas stream 48 over the catalyst system 38 in a first pass 52 and recirculating 54 at least a portion of the activation gas stream 48 over the catalyst system 38 in at least a second pass 56.

Figure 11:
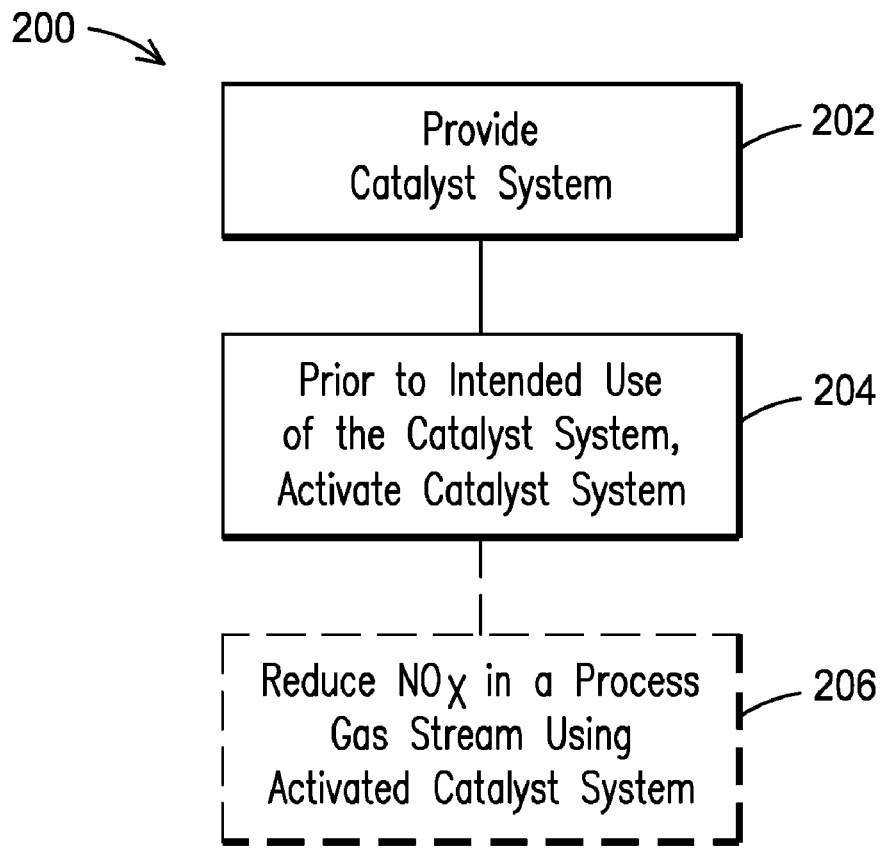
FIG. 11 is a flow diagram showing another embodiment of a method for utilizing a catalyst system in accordance with an aspect of the present invention.

Referring to FIG. 11, there is provided another embodiment of a method 200 for activating a catalyst system in accordance with the present invention. In the method 200, there is a step 202 of providing a catalyst system 38 comprising zirconia, palladium, and a pre-sulfated zirconia binder. The method further comprises step 204 of: prior to an intended use of the catalyst system 38 for a reduction of $NO_x$ in a process gas stream (e.g., turbine exhaust gas 29), activating the catalyst system 38 by passing an activation gas stream 48 comprising an amount of each of hydrogen, nitrogen oxides, water vapor, and oxygen over the catalyst system 38 for a time period of at least 7 minutes and to a maximum temperature of at least 180° C. In one embodiment, for example, the catalyst system 38 is heated to a maximum temperature of from 230° C. to 300° C. at a heating rate of 2-10° C./min over a period of at least 10 minutes, and in another embodiment, for at least an hour. Optionally, the method comprises after step 204 of activating, step 206 of contacting the activated catalyst system with a process gas stream having a $NO_x$ concentration, e.g., turbine exhaust gas 29, to reduce at least a portion of the $NO_x$ concentration in the process gas stream. The latter step (206) represents the intended use of the catalyst system 38.

Figure 12:
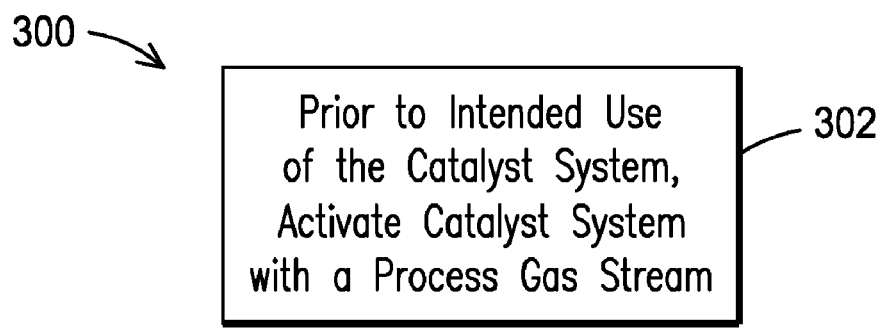
FIG. 12 is a flow diagram showing another embodiment of a method for utilizing a catalyst system in accordance with an aspect of the present invention.

Referring to FIG. 12, there is shown yet another embodiment of method 300 for activating a catalyst system 38 in accordance with the present invention. The method comprises step 302 of: prior to an intended use of a palladium-based catalyst system, e.g., catalyst system 38, for a reduction of nitrogen oxides in a process gas stream, e.g. turbine exhaust gas 29, activating the palladium-based catalyst system by passing the process gas stream over the palladium-based catalyst system while bringing a temperature of the palladium-based catalyst system up to a temperature of at least about 180° C. at a heating rate of from 1-20°/min. The process gas stream comprises an amount of each of hydrogen, nitrogen oxides, water vapor, and oxygen and constitutes the activation gas stream as described herein. In one embodiment, the process gas stream is the exhaust gas provided from combustion using natural gas with additional amounts of hydrogen provided from an additional source. In one embodiment, the catalyst system 38 is heated to a maximum temperature of from 230° C. to 300° C. at a heating rate of 2-10° C./min over a period of at least 10 minutes. Optionally, the method 300 may also further include during the step 302 of activating, flowing the process gas stream over the catalyst system 38 in a first pass 52 and recirculating 54 at least a portion of the process gas stream over the catalyst system 38 in at least a second pass 56. In this way, the process gas stream that will be treated by the catalyst system 38 may advantageously be used beforehand to activate the catalyst system 38, thereby providing substantial savings costs in piping, gas supplies, and the like.

Although the above-invention was described in the context of the power generation field, with specific emphasis on the treatment of gas turbine exhaust, the novel process as described herein may be applied to other $NO_x$ pollution sources, such as for example nitric acid plants and stationary emissions sources. The below examples are provided to illustrate certain aspects of the present invention and are not intended to be limiting in any respect.

Example 1

This example illustrates a method of synthesis of a Pd-based catalyst supported with pre-sulfated zirconia binder on $ZrO_2$—$SiO_2$ to form Pd/W ($ZrO_2$—$SiO_2$)$SO_4$ with approximately 0.75-1.0 wt % Pd. To arrive at this catalyst system, 4.5 Kg of zirconium hydroxide was added to a 5 gallon pail with 4.5 L of deionized (DI) water and 750 g of a colloidal silica solution (40% $SiO_2$). The pH of the zirconium hydroxide/silica solution was adjusted to about 3.0 with sulfuric acid and mixed overnight. The following morning, the solution was emptied into a pan and placed in an oven to dry at 110° C. until all the water was evaporated. Once dried, the resulting zirconia-silica-sulfate material was crushed below 40-mesh and calcined at 650° C. for 2 hrs.

The washcoat with binder was prepared by adding 21 g of said zirconia-silica-sulfate, 21 g of a zirconium oxynitrate solution (20% $ZrO_2$), 0.266 g ammonium metatungstate (Aldrich) and 50 mL of DI water to a beaker. Monolith cores (230 cells per square inch (cpsi)) were dipped in the slurry with excess slurry blown from the channels using an air knife. Catalyst cores were calcined at 450° C. for 1 hour. The washcoat loading was approximately 110 g per liter of monolith. After calcining, the cores were cooled and dipped into a solution of 2 g sulfuric acid in 98 g deionized (DI) water yielding a 1.98% sulfuric acid loading (2% sulfuric acid per washcoat). Blocks were then dried in a microwave and calcined at 650° C. for 2 hours.

A palladium metal solution was prepared by adding to a beaker: 8.165 g palladium chloride solution (8.94-9.35% Pd); 2.2 g TEA (triethanolamine); and sufficient DI water to yield a 100 g total solution weight. Monolith blocks were dipped in the solution yielding a 0.78% Pd loading by washcoat (catalyst system) weight. Excess solution was blown from the channels using an air knife. Blocks were dried in a microwave oven for 2-10 minutes and then calcined at 450° C. for 2 hours to decompose the palladium complex.

Example 2

This example illustrates the performance of the catalyst system developed according to Example 1 after activation by exposure of the catalyst system to simulated gas turbine combustion exhaust under different heating rates. The catalyst was prepared according to the procedure described in Example 1, with the concentration of Pd 0.75% (g Pd/g washcoat). Two blocks of the catalyst were placed in a glass reactor. The distance between the blocks was 10 mm. The simulated gas turbine exhaust comprised 10 vol. % $O_2$, 800 ppm $H_2$, 10 ppm $NO_x$, 5-25 vol. % $H_2O$, 5 ppm $SO_2$, and $N_2$ was the balance. The GHSV was 10,000 $hr^{-1}$. The catalyst was exposed to the flow of the gas with the above mentioned composition by means of a programmed temperature treatment while increasing temperature by 2° C./min and 10° C./min up to 250° C. Then the gas temperature was reduced to 120-140° C. to conduct $NO_x$ reduction tests. These results are provided in Table 1 below.

TABLE 1

| $NO_x$ Conversion after 3, 4 and 5 hours of $H_2$-SCR testing | | |
|---|---|---|
| Time, hours | Heating Rate 2° C./min | Heating Rate 10° C./min |
| 3 | $NO_x$ Conversion = 88% | $NO_x$ Conversion = 87% |
| 4 | $NO_x$ Conversion = 91% | $NO_x$ Conversion = 90% |
| 5 | $NO_x$ Conversion = 92% | $NO_x$ Conversion = 92.5% |

Example 3

This example illustrates the results of the performance of the developed catalyst system by continued exposure to the simulated gas turbine combustion exhaust after activation. The catalyst system was prepared according to the procedure described in Example 1, with the concentration of Pd 0.75% (g Pd/g washcoat). Two blocks of the catalyst system were placed in a glass reactor. The distance between the blocks was 10 mm. The simulated gas turbine exhaust had 10 vol. % $O_2$, 800 ppm $H_2$, 10 ppm NO, 5-25 vol. % $H_2O$, 5 ppm $SO_2$, and $N_2$ was the balance. The GHSV was 10,000 $hr^{-1}$. The catalyst system was exposed to the flow of the gas with the above mentioned composition by means of a programmed temperature treatment while increasing temperature by 2° C./min up to 250° C. Thereafter, the gas temperature was reduced to 120-140° C. to conduct $NO_x$ reduction tests under conditions with different gas compositions. Following 700 hours of testing, the catalyst system was periodically shutdown (every 200-300 hours) to simulate the real conditions of catalyst operation during a gas turbine run. During the shutdown process, the flow of the gases to the catalyst system was interrupted and the catalyst system was cooled down to a temperature of about 50° C. for 1-2 hours. Thereafter, the catalyst system was exposed to the simulated gas turbine exhaust and the flow and temperature were restored back to the aforementioned operating conditions for continuation of the testing process. The results are illustrated in FIG. 5, and demonstrate that the catalyst system shows stable performance over the duration of the test with high (greater than 90%) $NO_x$ removal efficiency.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process for activating a catalyst system comprising:
   providing a catalyst system comprising zirconia support particles, palladium and a pre-sulfated zirconia binder; and
   activating the catalyst system by passing an activation gas stream comprising an amount of each of oxygen, water vapor, nitrogen oxides, and hydrogen over the catalyst system and increasing a temperature of the catalyst system to a temperature of at least 180° C. at a heating rate of from 1-20°/min;
   wherein a concentration of the nitrogen oxides is from 10-100 ppm, a concentration of the water vapor is from 1-25 vol. %, a concentration of the oxygen from 1-18 vol. %, and wherein a concentration of the hydrogen provides a hydrogen/nitrogen oxides molar ratio from 1-100.

2. The process according to claim 1, wherein the concentration of the oxygen is from 5-10 vol. %, wherein the concentration of the water vapor is from 1-5 vol %, wherein the concentration of the nitrogen oxides is from 10-50 ppm, wherein the concentration of the hydrogen provides a hydrogen/nitrogen oxides molar ratio of from 8-80.

3. The process according to claim 1, wherein the catalyst system is heated to a maximum temperature of from 180° C. to 500° C.

4. The process according to claim 3, wherein the catalyst system is heated to a maximum temperature of from 230° C. to 300° C. at a heating rate of 2-10° C./min over a period of at least 10 minutes.

5. The process according to claim 1, wherein the catalyst system is cooled upon reaching the maximum temperature.

6. The process according to claim 1, wherein the activation gas stream is introduced into a reactor containing the catalyst system with a gas hourly space velocity (GHSV) of from 5,000-25,000 $hr^{-1}$.

7. The process according to claim 1, wherein the zirconia support particles comprise at least one of sulfated-zirconia $((ZrO_2)SO_4)$ or sulfated-zirconia-silica oxide $((ZrO_2—SiO_2)SO_4)$, and wherein the pre-sulfated zirconia binder comprises sulfuric acid-treated $ZrO_2$.

8. The process according to claim 1, further comprising, during said activating, recirculating at least a portion of the activation gas stream over the catalyst system in at least a second flowing gas stream.

9. A process for activating a catalyst system comprising:
providing a catalyst system comprising zirconia support particles, palladium, and a pre-sulfated zirconia binder; and
prior to an intended use of the catalyst system for a reduction of nitrogen oxides in a process gas stream, activating the catalyst system by passing an activation gas stream comprising an amount of each of oxygen, water vapor, nitrogen oxides, and hydrogen over the catalyst system for at least 7 minutes;
wherein during said activating, a temperature of the catalyst system is brought to a temperature of at least 180° C.

10. The process according to claim 9, further comprising, after said activating, contacting the process gas stream with the catalyst system to reduce at least a portion of the nitrogen oxides in the process gas stream.

11. The process according to claim 9, wherein the activation gas stream and the process gas stream are derived from the same source.

12. The process according to claim 9, wherein the activation gas stream is passed over the catalyst system for at least an hour.

13. The process according to claim 9, wherein the activation gas stream comprises oxygen in a concentration of from 1-18 vol. %, water vapor in a concentration of from 1-25 vol %, nitrogen oxides in a concentration of from 10-100 ppm, hydrogen in a concentration that provides a hydrogen/nitrogen oxides molar ratio of from 1-100.

14. The process according to claim 13, wherein the activation gas stream comprises oxygen in a concentration of from 5-10 vol. %, water vapor in a concentration of from 1-5 vol %, nitrogen oxides in a concentration of from 10-50 ppm, hydrogen in a concentration that provides a hydrogen/nitrogen oxides molar ratio of from 8-80.

15. The process according to claim 9, wherein the catalyst system is heated to a maximum temperature of from 230° C. to 300° C. at a heating rate of 2-10° C./min over a period of at least 10 minutes.

16. The process according to claim 9, wherein the zirconia support particles comprise at least one of sulfated-zirconia $((ZrO_2)SO_4)$ or sulfated-zirconia-silica oxide $((ZrO_2—SiO_2)SO_4)$, and wherein the pre-sulfated zirconia binder comprises sulfuric acid-treated $ZrO_2$.

17. The process according to claim 9, further comprising, during said activating, recirculating at least a portion of the activation gas stream over the catalyst system in at a second flowing gas stream.

18. A process for activating a catalyst system comprising:
prior to an intended use of a palladium-based catalyst system for a reduction of nitrogen oxides in a process gas stream, activating the palladium-based catalyst system by passing the process gas stream over the palladium-based catalyst system while bringing a temperature of the palladium-based catalyst system up to a temperature of at least about 180° C. at a heating rate of from 1-20°/min;
wherein the process gas stream comprises an amount of each of oxygen, water vapor, nitrogen oxides, and hydrogen.

19. The process according to claim 18, wherein the process gas stream is an exhaust gas from natural gas combustion, and wherein the process gas stream comprises oxygen in a concentration of from 5-18 vol. %, water vapor in a concentration of from 1-25 vol %, nitrogen oxides in a concentration of from 10-100 ppm, hydrogen in a concentration that provides a hydrogen/nitrogen oxides molar ratio of from 1-100.

20. The process according to claim 18, wherein the catalyst system is heated to a maximum temperature of from 230° C. to 300° C. at a heating rate of 2-10° C./min over a period of at least 10 minutes.

* * * * *